(No Model.)

C. M. CARHART.
FRICTION CLUTCH.

No. 445,496. Patented Jan. 27, 1891.

2 Sheets—Sheet 1.

WITNESSES
H. Walker
E. M. Clark

INVENTOR:
C. M. Carhart
BY
Munn & Co.
ATTORNEYS (No Model.) 2 Sheets—Sheet 2.
C. M. CARHART.
FRICTION CLUTCH.
No. 445,496. Patented Jan. 27, 1891.
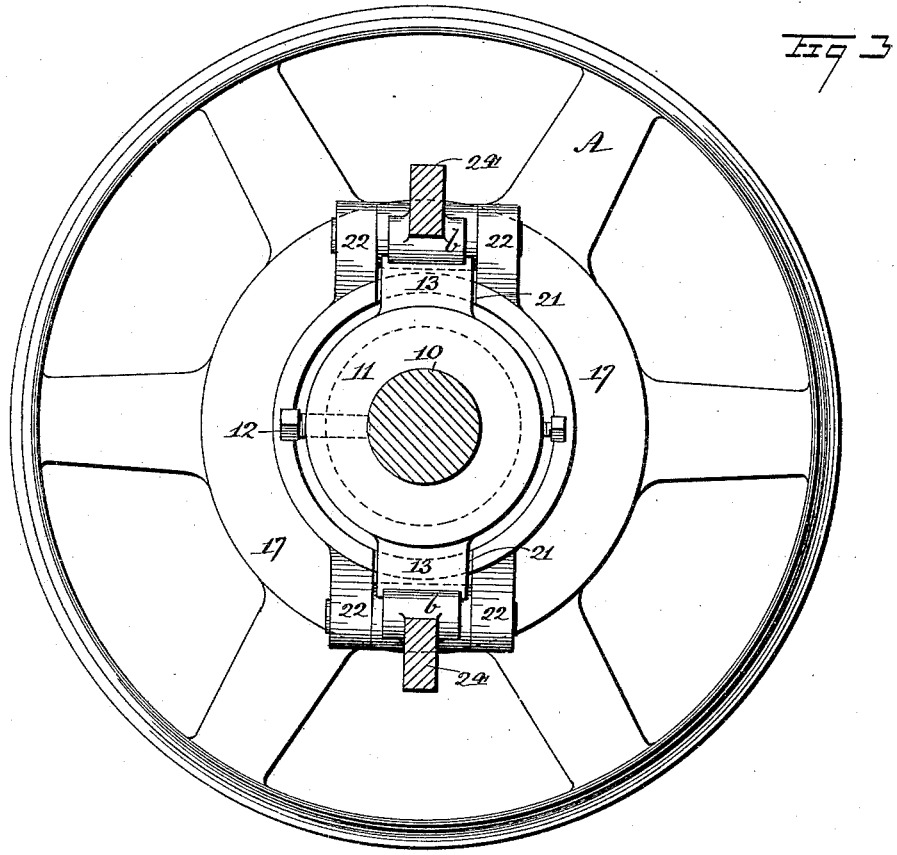
Fig. 3
Fig. 4
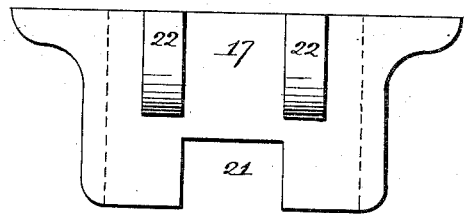
WITNESSES:
H. Walker
E. M. Clark
INVENTOR:
C. M. Carhart
BY Munn & Co.
ATTORNEYS

UNITED STATES PATENT OFFICE.

CLARENCE M. CARHART, OF PLAINFIELD, NEW JERSEY.

FRICTION-CLUTCH.

SPECIFICATION forming part of Letters Patent No. 445,496, dated January 27, 1891.

Application filed October 16, 1890. Serial No. 368,254. (No model.)

*To all whom it may concern:*

Be it known that I, CLARENCE M. CARHART, of Plainfield, in the county of Union and State of New Jersey, have invented a new and useful Improvement in Friction-Clutches, of which the following is a full, clear, and exact description.

My invention relates to an improvement in friction-clutches, and has for its object to simplify the construction of such devices and provide a device especially adapted for use in connection with pulleys and a means whereby a pulley may be expeditiously and effectively connected with and disconnected from a shaft, as may be desired.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
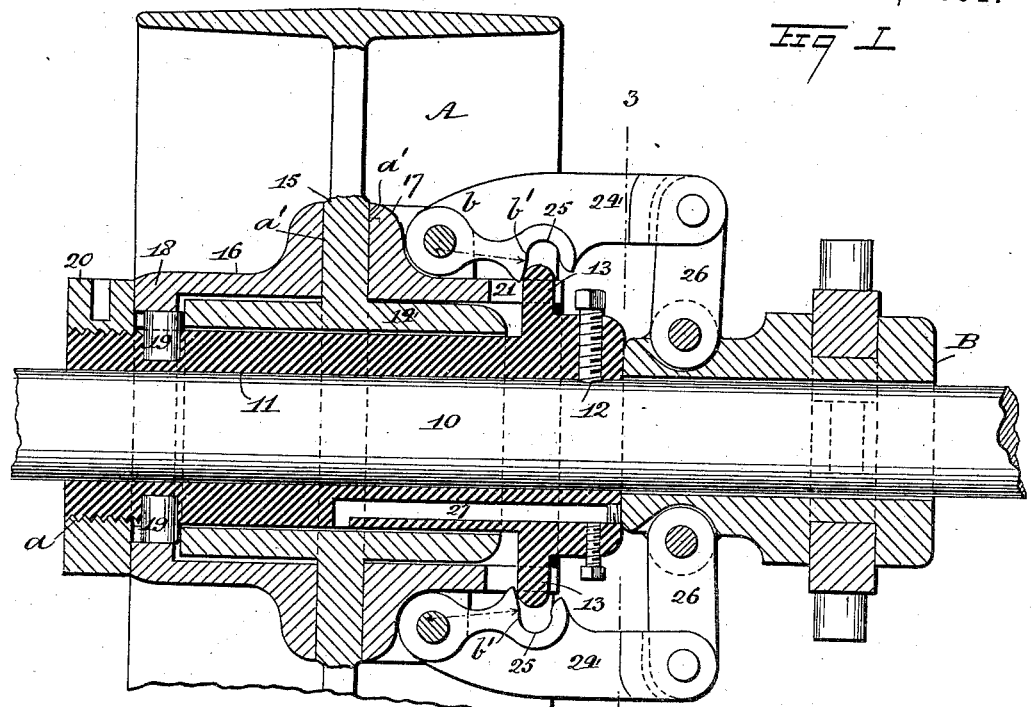
Figure 2:
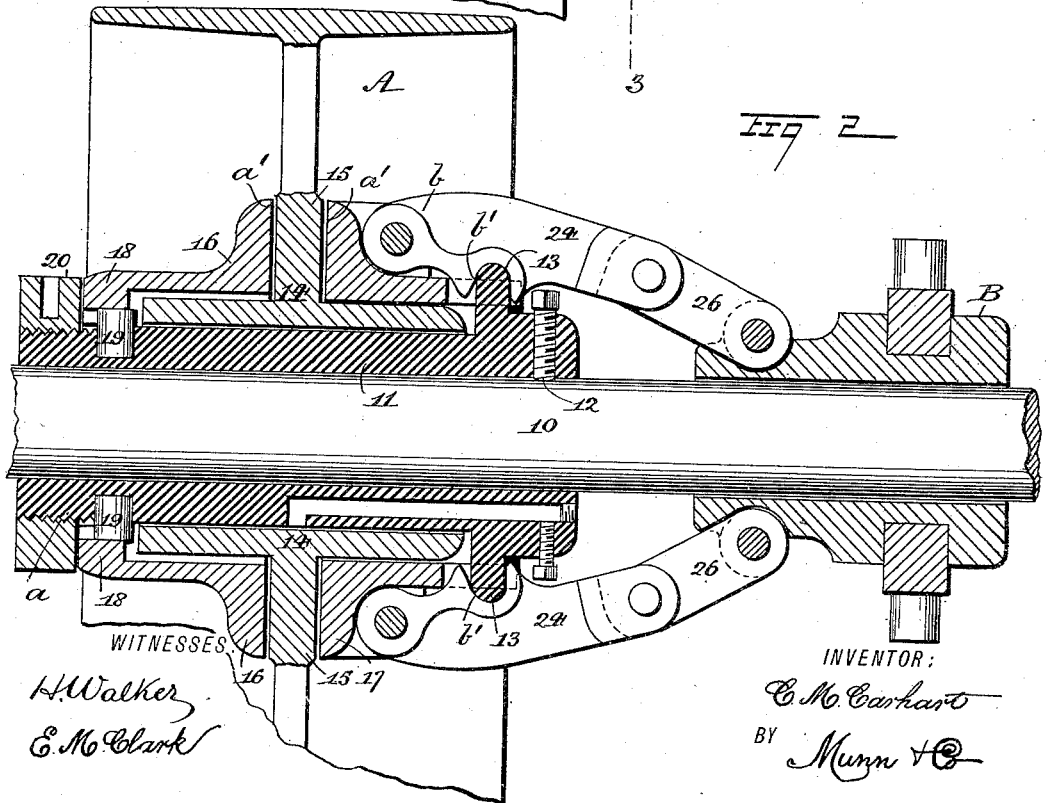

Figure 1 is a central longitudinal section through the device connected with a pulley, illustrating the pulley as connected with a shaft. Fig. 2 is a similar view, the pulley being illustrated as disconnected from the shaft. Fig. 3 is a transverse section through the shaft and a portion of the clutch, the section being taken on the line 3 3 of Fig. 1; and Fig. 4 is a plan view of one of the collars forming a portion of the device.

Upon the shaft 10 a sleeve 11 is mounted, which is attached to the said shaft by means of set-screws 12 or equivalent devices. One end of the sleeve is exteriorly threaded, as illustrated at $a$ in Figs. 1 and 2, and near the other end two diametrically-opposite lugs 13 are located, which lugs are preferably integral with the sleeve, and their upper edges are ordinarily cylindrical, as illustrated.

Upon the sleeve 11 at the back of the lugs 13 the hub 14 of a pulley A is loosely mounted, the said hub being provided with an annular central flange 15. The flange 15 of the hub is made to engage with two collars 16 and 17, one collar being located at each side of the flange, as shown in Figs. 1 and 2. Both of the collars are enlarged at their inner ends and provided, preferably, with flat faces $a'$, which flat faces engage with the hub-flange 15. The outer end of the collar 16 is provided with an internal rib 18, which is longitudinally grooved to receive pins 19, which pins are inserted in the sleeve 11 near its threaded end, the said pins, in conjunction with the lugs 13, being adapted to connect the collar 16 with the sleeve. The collar 16 is adjustable toward the flange 15 of the pulley-hub to compensate for any wear of its face $a'$ by means of an adjusting-nut 20, screwed upon the threaded extremity of the sleeve. The collar 17 is provided at its outer end with diametrically-opposite recesses 21, as shown in Figs. 1, 2, and 4, which recesses are adapted to receive the lugs 13 of the sleeve. Back of the recesses 21 in the collar 17 spaced ears 22 are provided, and between each pair of ears the inner end of a link 24 is pivoted, the outer ends of which links are preferably forked. The under edge of the upper link and the upper edge of the lower link, from a point near their centers to their pivotal extremities, are re-enforced or thickened, as illustrated at $b$, and in the re-enforced edges of the links recesses 25 are produced, which recesses are immediately over the lugs 13 of the sleeve. The recesses 25 are preferably somewhat U-shaped; but the inner wall $b'$ of the recesses is given a cam-face, as the wall is formed upon the arc of a circle, the circle being struck from a point eccentric with the center of the pivot of the links, as is indicated by the arrows. The cam-faces $b'$ of the links 24 are adapted to engage with the cylindrical outer edges and rear faces of the sleeve-lugs 13, and the action of the links 24 is such that they may properly be called "cam-levers."

A shifting device B, of any suitable or approved construction, is held to slide upon the shaft 10, and the said shifting device is pivotally connected with the links or levers 24 by means of links 26, whereby a toggle-connection between the shifting device and the collar 17 is effected The sleeve 11 is usually provided with a longitudinal oil-chamber 27, having an inlet at one end stopped by a suitable plug or cap and an outlet at the opposite end, whereby the oil is fed between the inner surface of the pulley-hub and the exterior surface of the sleeve.

In operation, when the shifting device B is carried in the direction of the pulley, the links 26 are vertical and the links or levers 24 essentially horizontal. In carrying the links or levers 24 to their horizontal positions they are carried outward from the sleeve, and the inner ends of the cam-faces only engage with the back of the sleeve-lugs 13. When the links or levers 24 are in the horizontal position, the collars 17 are forced against the hub-flange 15 and the said flange is tightly gripped by both of the collars 16 and 17, as when the collar 17 engages with the hub-flange it forces it against the collar 16. When the parts are in the position just described, and shown in Fig. 1, the pulley is connected with the shaft through the medium of the pins 19 and both the shaft and pulley revolve together. When the shifting device B is carried away from the pulley, the links or levers 24 are drawn inward toward the sleeve, as the links 26 are carried outward, and as the links or levers 24 are drawn inward the recesses 25 therein receive the lugs 13 of the sleeve, and the walls of the recesses opposite the cam-faces $b'$, by engagement with said lugs, draw the collar 17 away from the hub-flange, and the pulley is thereby free to turn independently of the shaft, as there is ample space for it to shift in the direction of the shifting device between the pins 19 and the bottom of the lugs 13, and in so shifting the pulley moves away from the collar 16. It is evident that when the shifting device is moved inward, causing the links or levers 24 to be carried outward, the cam-surfaces $b'$ of said links or levers riding upon the lugs 13 will force the collar 17 inward a sufficient distance to bind the flange 15 of the pulley-hub between it and the opposite collar 16.

Having thus described my invention, I claim as new and desire to secure by Letters Patent—

1. The combination, with a pulley having a hub-flange, a clamping-collar engaging the hub and adapted for contact with the flange, and a fixed sleeve, of a cam-lever pivoted to the collar and engaging with the sleeve, and a shifting mechanism connected with the cam-lever, as and for the purpose specified.

2. In a device of the character described, the combination, with a sleeve provided with diametrically-opposite lugs and a pulley held to turn upon the sleeve, the hub of which is provided with an annular flange, of a collar encircling the pulley-hub at one side of the flange and engaging with the flange, the said collar having a connection with the sleeve, a collar also encircling the hub and engaging with the opposite side of its flange, a shifting device, and a link-connection between the latter collar and the shifting device, several of the links being provided with a recess to receive the lugs of the sleeve, one wall of said recesses being a cam-surface, as and for the purpose specified.

3. In a device of the character described, the combination, with a sleeve, a pulley mounted loosely upon the sleeve, the hub of which is provided with an annular flange, and a fixed collar loosely surrounding the hub, connected with the sleeve and adapted for engagement with one side of the hub-flange, of a movable collar also encircling the hub and adapted for engagement with its flange, lugs formed upon the sleeve, a shifting device, and links connecting the shifting device and the movable collar, several of which links are provided with recesses to receive the lugs of the collar, one side wall of which recesses constitutes cam-surfaces, as and for the purpose specified.

4. In a device of the character described, the combination, with a sleeve provided with diametrical lugs, a pulley mounted loosely upon the sleeve, the hub of which is provided with an annular flange, and a collar on the hub connected with the sleeve and adapted to engage one side of the hub-flange, of a movable collar on the hub adapted for engagement with its flange, cam-levers pivoted on the movable collar and adapted to engage the sleeve-lugs, a shifting device, and links connecting the levers and shifting device, as and for the purposes specified.

CLARENCE M. CARHART.

Witnesses:
GEORGE W. GRANT,
JOSEPH H. MITCHELL.